United States Patent [19]
Masel et al.

[11] Patent Number: 6,109,169
[45] Date of Patent: Aug. 29, 2000

[54] GRILLING APPLIANCE

[75] Inventors: Ruben Masel, Ramat Hasharon; George Valdshtein, Givat Savyon, both of Israel

[73] Assignee: The Dime Group Corp., New York, N.Y.

[21] Appl. No.: 09/426,876

[22] Filed: Oct. 26, 1999

Related U.S. Application Data

[60] Continuation-in-part of application No. 09/239,315, Jan. 29, 1999, Pat. No. 6,003,436, which is a division of application No. 08/613,231, Mar. 8, 1996, Pat. No. 5,970,851, which is a continuation-in-part of application No. PCT/US94/09968, Sep. 6, 1994.

[30] Foreign Application Priority Data

Sep. 9, 1993 [IL] Israel ........................ 106957

[51] Int. Cl.⁷ ..................................... A47J 37/08
[52] U.S. Cl. ................. 99/334; 99/385; 99/389; 99/391; 99/400; 99/446; 219/386; 219/521
[58] Field of Search ............................. 99/326–334, 400, 99/337, 401, 338, 403, 385–393, 444–446, 426; 219/521, 386; 426/523

[56] References Cited

U.S. PATENT DOCUMENTS

| | | |
|---|---|---|
| 1,948,739 | 2/1934 | Wolocott et al. .................. 99/389 X |
| 2,028,159 | 1/1936 | Kemp ................................. 99/391 X |
| 2,441,190 | 5/1948 | Fuller ................................ 99/394 X |
| 2,821,187 | 1/1958 | Tescula ................................ 99/390 |
| 2,975,698 | 3/1961 | Miller ............................... 99/400 X |
| 3,056,344 | 10/1962 | Miller .............................. 99/390 X |
| 3,279,350 | 10/1966 | Kaplan ............................. 99/391 X |
| 3,495,524 | 2/1970 | Miles ................................... 99/389 |
| 4,129,067 | 12/1978 | Reiland .............................. 99/391 |
| 4,627,410 | 12/1986 | Jung ............................... 219/521 X |
| 4,762,058 | 8/1988 | Masel et al. ........................ 99/425 |
| 5,181,455 | 1/1993 | Masel et al. ........................ 99/391 |
| 5,487,328 | 1/1996 | Fujii ............................... 219/386 X |

Primary Examiner—Timothy Simone

[57] ABSTRACT

A grilling appliance includes a housing having a vertical food compartment for receiving a food article in a vertical position, a heated first grill plate mounted in a vertical position in one side of the food compartment, a heated second grill plate mounted in a vertical position in the opposite side of the food compartment, and a non-electrical drive for driving the second grill plate to an extended position towards the first grill pate, or to a retracted position away from the first grill plate. In one disclosed embodiment, the drive is pneumatically actuated, and in a second disclosed embodiment, the drive employs a screw, gear, and electromagnetic clutch mechanism. Also described are food holders particularly useful with such grilling appliance.

20 Claims, 5 Drawing Sheets

GRILLING APPLIANCE

CLOSELY RELATED APPLICATION

This application is a continuation-in-part of patent application Ser. No. 09/239,315 filed Jan. 29, 1999, now U.S. Pat. No. 6,003,436, which is a division of patent application Ser. No. 08/613,231 filed Mar. 8, 1996, now U.S. Pat. No. 5,970,851, which is a continuation-in-part of PCT/US94/09968, filed Sep. 6, 1994 which claims priority from Israeli patent application 106957 filed Sep. 9, 1993.

FIELD AND BACKGROUND OF THE INVENTION

The present invention relates to grilling appliances, and particularly to an electrical grilling appliance for use in grilling meat products, such as steaks, hamburgers, and the like, in an extremely short time. The invention also describes food holders particularly useful in such grilling appliances.

A large number of electrical grilling appliances are known and described in the patent literature. The known grilling appliances generally include open grills, racks or meshes for holding the food article to be grilled. However, such grilling appliances usually require a considerably period of time to grill a steak or hamburger. Other appliances are known, such as described in our prior U.S. Pat. Nos. 4,762,058 and 5,181,455, which permit food articles to be grilled in a relatively short period of time.

A grilling appliance teaching a simplified, compact and efficient system to grill food articles in a very short period of time is disclosed in our copending U.S. patent application Ser. No. 08/631,231 filed Mar. 8, 1996, now U.S. Pat. No. 5,970,851. This appliance disclosed and claimed driving means to urge grilling plates to one another to cause the food article to be pressed therebetween. While this patent application disclosed in detail electrical motor drive means for moving the plates together, and discussed the substitution of manual drive means for the electrical drive means and broadly claimed both such means, no specific manual drive means were disclosed.

Thus, there is a need for providing a simplified yet efficient appliance that permits the grilling of food articles in the manner disclosed in the aforementioned patent application yet allows for the use of manual drive means, thereby appreciably reducing the cost of these appliances.

It is therefore an object of the present invention to provide a novel, simplified construction for a manual grilling appliance which permits food articles, such as steaks, hamburgers, and the like, to be grilled in a very short period of time.

OBJECT AND BRIEF SUMMARY OF THE INVENTION

According to present invention, there is provided a grilling appliance, comprising: a housing including a vertical food compartment for receiving a good article in a vertical position; a heated first grill plate mounted in a vertical position in one side of the food compartment; a heated second grill plate mounted in a vertical position in the opposite side of the food compartment; and a drive for driving at least one of said grill plates to an extended position towards the other grill plate, or to a retracted position away from the other grill plate.

According to the first of two described embodiments, the drive includes a manually operated pneumatic actuated drive means for driving the movable grill plate to its extended position. A further embodiment is described wherein a lever, a screw to drive the movable grill plate to its extended position and a spring return to drive it to its retracted position.

As will be described more particularly below, a grilling appliance of relatively simple structure may be constructed in accordance with the foregoing features to permit food articles, particularly meat products, to be grilled in a very short period of time. Thus, when, e.g., the second grill plate is forced to its extended position, it presses the food article between it and the first grill plate thereby producing high heat transfer between the two grill plates and the food article, which substantially reduces the required grilling time. Moreover, when grilling an article of greater thickness, the appliance may be designed to apply a larger pressure by the two grilling plates, thereby increasing the heat transfer to it, and making the grilling time less dependent on the thickness of the food article.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
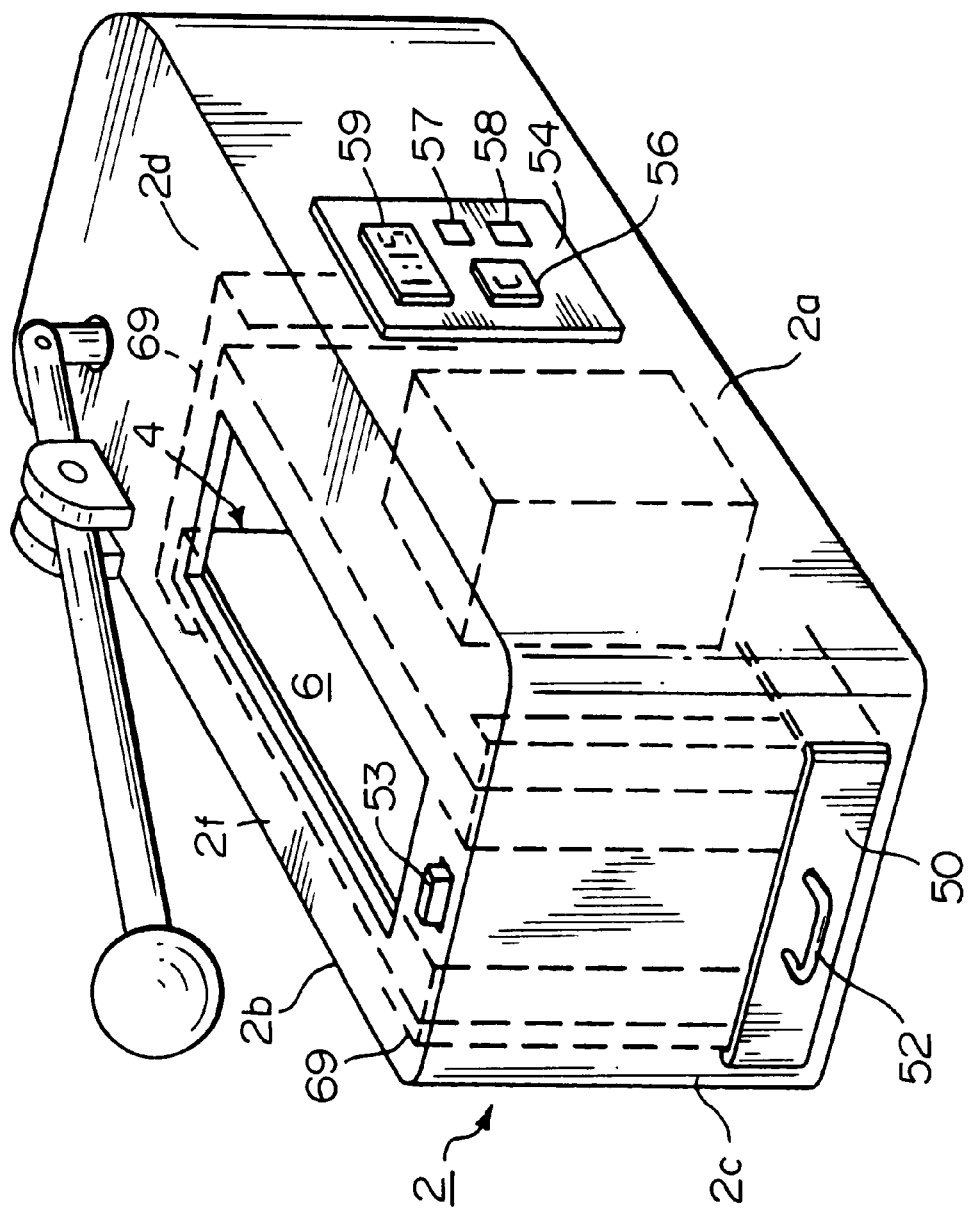
FIG. 1 is a three-dimensional view illustrating one form of grilling appliance constructed in accordance with the present invention.

Referring now to the Figures, the grilling appliance illustrated in the drawings comprises a housing 2 of the general configuration of, but slightly larger than, a conventional electrical toaster. The housing includes a front wall 2a, a rear wall 2b, opposed end walls 2c, 2d, a bottom wall 2e and a top wall 2f. The top wall 2f is formed with an enlarged rectangular opening 4 for introducing the food article to be grilled into a food compartment 6 within the housing.

A drip pan 50 is receivable within housing 2 to underlie the food compartment 6, and thereby to catch the drippings from the food article during the time it is being grilled. Drip pan 50 is insertable into the housing via an opening formed in the housing end wall 2c, and is provided with a handle 52 to facilitate introducing and removing it from the housing.

Figure 2:
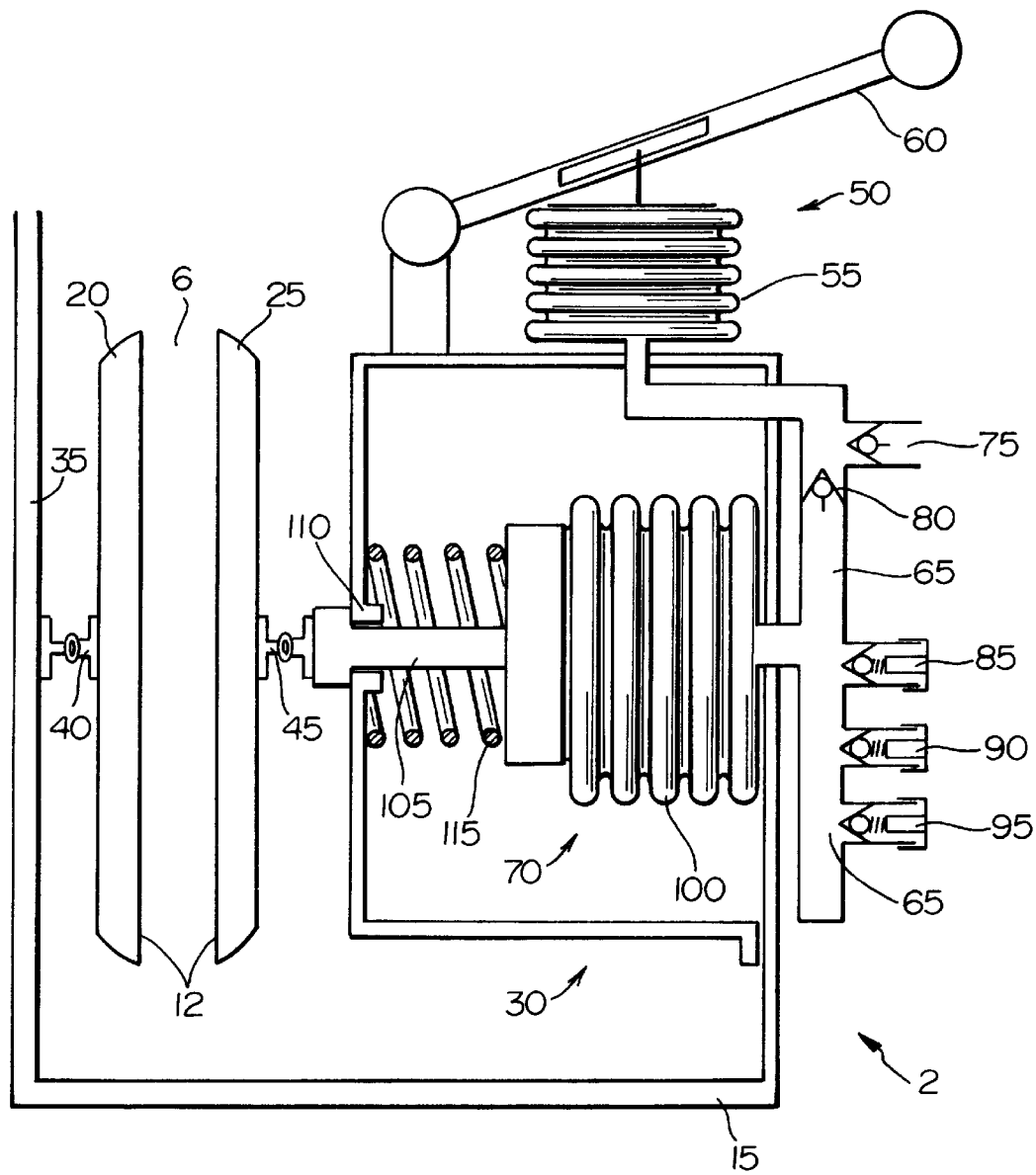
FIG. 2 diagrammatically illustrates the internal construction of the grilling appliance of FIG. 1 employing a pneumatic mechanism according to a first preferred embodiment.

A microswitch 53, at one side of opening 4 in the top wall 2f of the housing, is depressible for energizing the electrical heaters (not shown) within the two grill plates 20 and 25 (see FIG. 2). The front wall 2a of the housing is provided with a control panel 54 which includes an on/off switch 56, an up-time timer button 57, a down-time timer button 58, and a timer display 59 permitting the grilling time to be preselected and displayed.

Reference is now made to FIG. 2 which is a simplified schematic illustration of a grilling appliance 2 constructed and operative in accordance with a preferred embodiment of the present invention. For simplicity, electrical interfaces in the grilling appliance 2 are not shown in FIG. 2 since such electrical interfaces are conventional and well known in the art.

Grilling appliance 2 preferably includes housing 15, vertically positioned grilling plates 20 and 25, and a pneumatic mechanism 30. A first grilling plate 20 is mounted in a vertical position on one side of the food compartment 6, and a second grill plate 25 is mounted in a vertical position on the opposite side of the food compartment. The two grill plates 20 and 25 are similarly constructed with a metal face plate 12 facing the food compartment 6, an internal electrical heater (not shown), and thermal insulation (not shown). Grill plate 20 is floatingly mounted to the housing end wall 2b by horizontally-extending universal joint 40. This floating mounting permits universal angular movement of the grill plate 20 and its Y and Z axes. Grilling plate 25 is preferably suspendedly coupled to the pneumatic mechanism 30 via a universal joint 45 and may be horizontally moved forward and backward by the pneumatic mechanism 30.

Pneumatic mechanism 30 preferably includes an air pump unit 50 having a bellows 55 and a pump lever 60 coupled to bellows 55. The first air pump unit 50 is preferably manually operated by a user for pumping air via a pipe 65 into a pneumatic actuator unit 70. Pipe 65 preferably includes an air intake valve 75 and a pump valve 80 that directs air in a direction towards the actuator 70. Additionally, pipe 65 also includes two pressure sensitive valves 85 and 90; and a pressure release valve 95 having open and close states that are electrically controlled via the electrical interfaces (not shown) as is well known in the art.

The actuator 70 preferably can take many embodiments, such as a bellows 100 which is operative to push a piston 105 via linear bearing 110 against a retracting spring 115. Piston 105 is preferably coupled to the grilling plate 25 via the universal joint 45 and is operative to push or pull the grilling plate 25 horizontally in a forward or backward direction respectively.

The operation of the grilling appliance 2 is now briefly described. Preferably, a user inserts a food article to be grilled (not shown) in the space 6 between the grilling plate 20 and the grilling plate 25. The user then sets the settings on valves 85 and 90 to the grilling setting desired based on the nature of the food being grilled and the desired texture and pressure desired. The grilling plates 20 and 25 are preheated by depressing microswitch 53. Then, the user causes contact between the grilling plates 20 and 25 and the food article by operating the pump lever 60 downwardly using mechanical force to pump air into the pipe 65. The food item is grilled under mechanically applied pressure of force by the two grilling plates 20, 15.

When air is pumped into the pipe 65 by the operation of lever 60, the pressure sensitive valves 85 and 90 preferably adjust the air pressure in the pipe 65 and thereby the pressure operated on the food article. Adjustment of the air pressure is performed so as to restrict the maximum force applied to the food article according to predetermined criteria depending on the type of the food article. It is appreciated that typically a maximum force operating on the food article of up to 150 Newton is required, and thus the pressure sensitive valve 85 may be adjusted to maintain air pressures which provide up to 150 Newton on the food article. Conversely, the pressure sensitive valve 90 is preferably adjusted so as to maintain air pressures higher than a predetermined low air pressure threshold, wherein the low air pressure threshold may be determined, for example, so as to just hold the food article fixed between the grilling plates 20 and 25. It is appreciated that if the bottom surface of the bellows 100 which exerts force on the piston 105 has a surface area of 100 $cm^2$, then air pressure required to reach a force of 150 Newton is only 0.15 bar which is typically easily accessible. As is evident, grilling plates 20 and 25 have freedom, through their respective universal joints to adopt their position relative to the shape of the food article inserted therebetween.

The grilling plates 20 and 25 are heated via the electrical interfaces and the food article may be grilled to a required texture and appearance. The required texture and appearance may be reached, for example, by using a timer 57, 58 in the grilling appliance 2 which stops heating of the grilling plates 20 and 25 and retracts grilling plate 25 after a predetermined time period as is well known in the art.

Preferably, when heating of the grilling plates 20 and 25 is stopped, or a predetermined time period afterwards, pressure release valve 95 is electrically or electromagnetically opened so as to release air pressure in the pneumatic mechanism 30. When air pressure is released, spring 115 retracts the grilling plate 25 away from grilling plate 20 thereby releasing the grilled food article.

Figure 3:
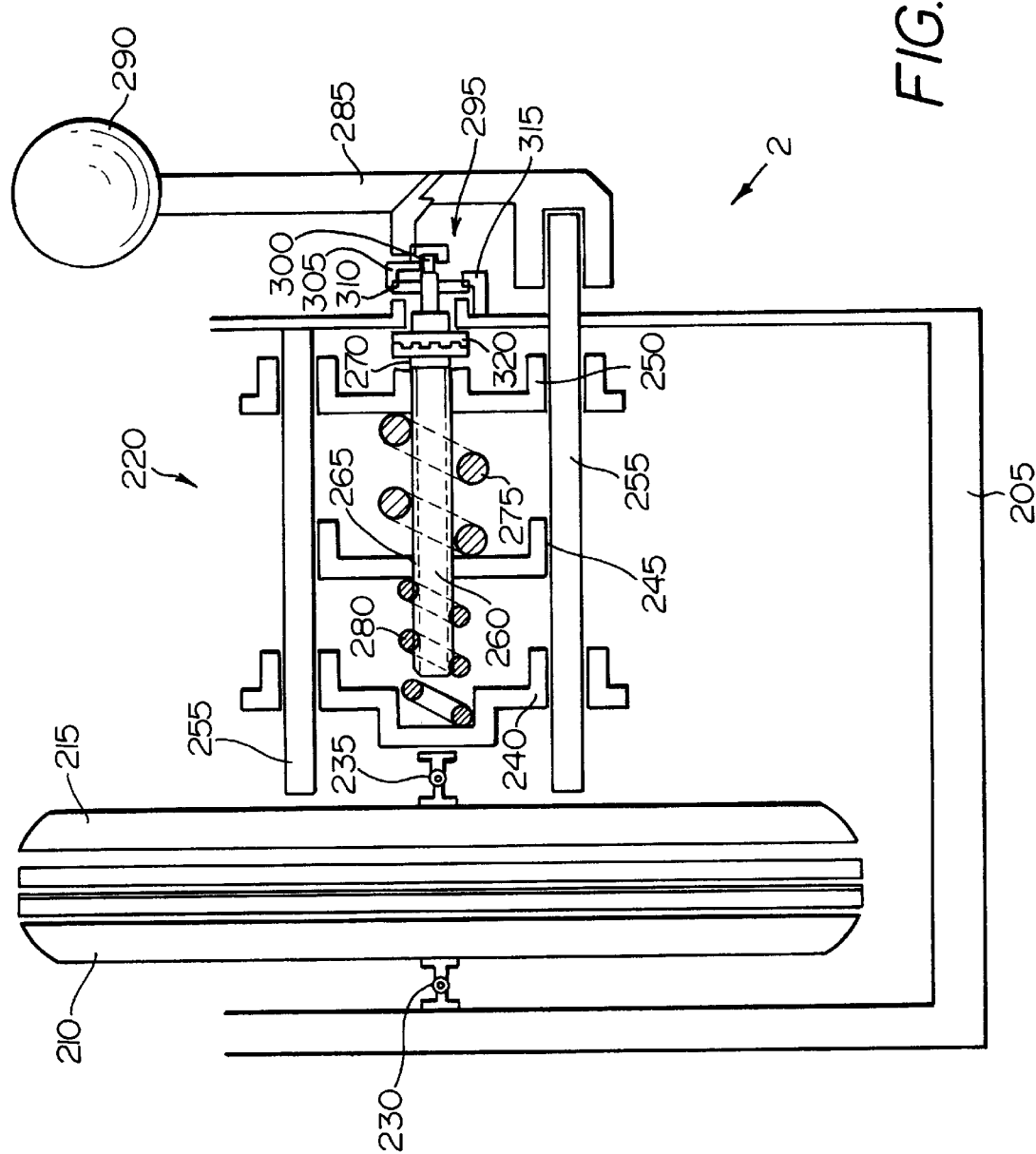
FIG. 3 diagrammatically illustrates the internal construction of the grilling appliance of FIG. 1 according to a second preferred embodiment.

Reference is now made to FIG. 3 which is a simplified schematic illustration of a grilling appliance 2 constructed and operative in accordance with another preferred embodiment of the present invention. For simplicity, electrical interfaces in the grilling appliance 2 are not shown in FIG. 3 since such electrical interfaces are conventional and well known in the art.

Grilling appliance 2 preferably includes housing 205, vertically positioned grilling plates 210 and 215, and a spring-based mechanism 220. The grilling plate 210 is preferably suspendedly mounted to a wall 225 of the housing 205 via a universal joint 230. The grilling plate 215 is preferably suspendedly coupled to the spring-based mechanism 220 via a universal joint 235 and may be horizontally moved forward and backward by the spring-based mechanism 220.

The spring-based mechanism 220 preferably includes three plates: a front plate 240, a middle plate 245, and a rear plate 250. The front plate 240 is preferably the plate which is the closest to the grilling plate 215 and is coupled to the grilling plate 215 via the universal joint 235, whereas the rear plate 250 is the farthest from the grilling plate 215.

Preferably, the three plates 240, 245 and 250 slide forward or backward over two guides 255. A screw 260 preferably passes through a hole 265 in the middle plate 245 and through a nut 270 inserted in a hole (not shown) in the rear plate 250. The screw 260 also passes through a first spring 275 located between the middle plate 245 and the rear plate 250, and through a second spring 280 located between the middle plate 245 and the front plate 240. Preferably, the first spring 275 has a higher tension constant than the second spring 280.

A lever 285 having a handle 290 with an internal gear is used to rotate the screw 260. The internal gear of the handle 290 is preferably engaged with a gear mechanism 295 and is operative to rotate at least one gear wheel 300 within the gear mechanism 295. The gear wheel 300 preferably has a latch 305 that is engaged with a ratchet wheel 310. It is appreciated that the ratchet wheel 310 is preferably restricted from back rotation by a stationary latch 315. Preferably, an electromagnetic clutch 320 controlled via the electrical interfaces (not shown) clutches gear wheel 300 and the screw 260 so as to enable rotation of the screw 260 together with the gear wheel 300 in response to rotation of the lever 285.

The operation of the grilling appliance 2 is now briefly described. Preferably, a user inserts a food article to be grilled (not shown) in the space 6 between the grilling plate 210 and the grilling plate 215. Then, the user rotates the lever 285 using mechanical force in order to force the grilling plates 210 and 215 to contact and press the food article.

The electromagnetic clutch 320 clutches gear wheel 300 to the screw 260 thereby enabling rotation of the screw 260 towards grill plate 215. Rotation of the screw 260 moves the plates 240, 245 and 250 and the grilling plate 215 forward towards the grilling plate 210, thereby causing contact between the grilling plates 210 and 215 and the food article. As is evident, grilling plates 215 and 210 have freedom, through their respective universal joints to adopt their position relative to the shape of the food article inserted therebetween. It is appreciated that the rotation of the screw 260 is made through the nut 270 and is enabled in one direction only by the ratchet wheel 310 that is restricted from back rotation by the stationary latch 315.

If grilling of the food article requires additional pressing of the food article between the grilling plates 210 and 215, the user may further rotate the lever 285 thereby compressing the second spring 280. When the second spring 280 is fully compressed and the user continues to rotate the lever 285, the first spring 275 compresses until a required pressure against the food article is reached. It is appreciated that since the first spring 275 has a higher tension constant than the second spring 280, pressure on the food article may be adjusted to a required value by either compressing the second spring 280 or the two springs 275 and 280.

Preferably, the grilling plates 210 and 215 are preheated via the electrical interfaces, and the food article may be grilled to a required texture and appearance. The required texture and appearance may be reached, for example, by using a timer 57,58 in the grilling appliance 2 which stops heating of the grilling plates 210 and 215 after a predetermined time period as is well known in the art.

When the timer 57, 58 gives the command to cease the heating of the grilling plates 210 and 215 is also electrically disconnects the electromagnetic clutch 320 via the electrical interfaces. Clutch 320 thereupon disconnects the gear wheel 300 from the screw. When the electromagnetic clutch 320 is released, springs 275, 280 cause backward rotation of the screw 260. This causes the grilling plate 215, together with the plates 240, 245 and 250, to be pulled away from the food article, thereby releasing it.

The magnitude of the force applied by grill plate 215 against the food article when the grill plate is in its extended position will be larger when relatively thick food articles are being grilled than when thinner food articles are being grilled. This accelerates the grilling of relatively thick food articles, thereby making the grilling time less dependent on the thickness of the food articles being grilled.

Figure 4:
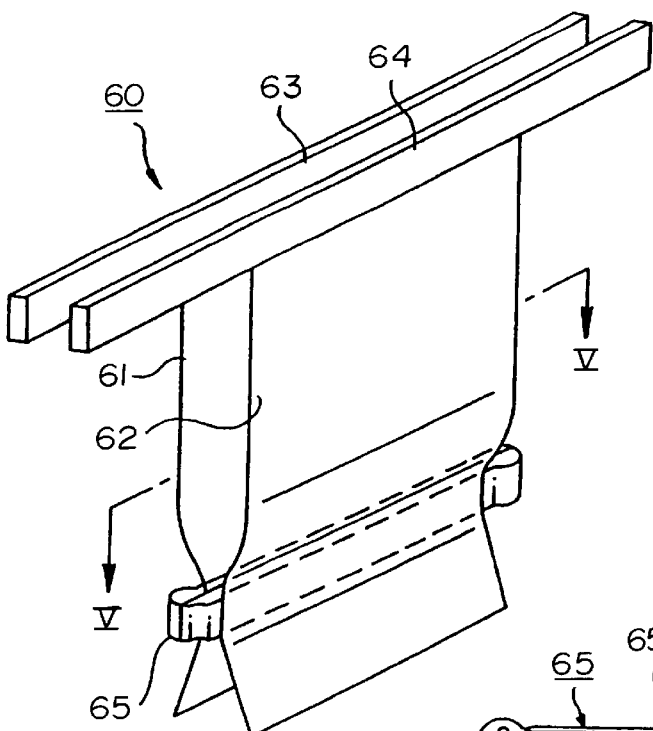
FIGS. 4 and 5 illustrate one type food holder for use in the grilling appliance, FIG. 5 being a sectional view along line V—V of FIG. 4.
Figure 5:
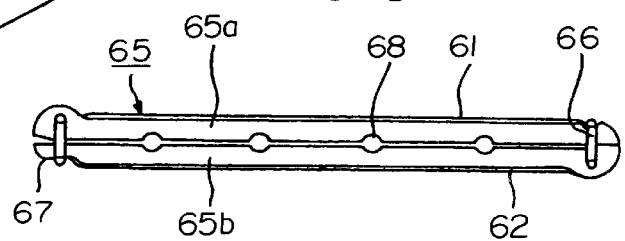

FIGS. 4 and 5 illustrate one form of food holder 60 which may be used with the grilling appliance for holding the food articles within the grilling compartment 6 of the appliance 2. Food holder 60 includes a pair of flexible panels 61, 62 joined at their tops to a pair of handles 63, 64 and joined at their bottoms by clamping member 65. The sides of the two flexible panels 61, 62 are open so that the two panels may conveniently receive a food article (e.g., steak or hamburger) to be grilled. Clamp 65, which supports the food article between the two panels 61, 62, includes two jaws 65*a*, 65*b* pivotally mounted at one end by a claps 66 or the like, and openable at the opposite end by a reasonable clasp 67. The outer faces of the two jaws 65*a*, 65*b* are bonded to the inner faces of the two flexible panels 61,62. The inner faces of the two jaws are formed with spaced recesses 68 defining drain openings to permit draining of liquids therethrough to the drip pan 50.

The flexible panels 61, 62 may be made of a heat resistant, stick-resistance plastic, such as "Teflon" (Reg. TM) or of a flexible metal sheet material (e.g., aluminum) coated with such a heat-resistance, stick-resistant plastic. The dimensions of the flexible panel 61, 62 are larger than the dimensions of the two grill plates (20,25, or 210,215), whereby they always completely cover them and keep them relatively clean. The overall thickness of the clamping member 65 is less than that of the food article to be held by the holder 60 so that the flexible panels 61, 62 better conform to the outer shape of the food article. A pair of removable splash guards 69 (FIG. 1) straddle the ends of the two grill plates (20,25 or 210,215) on opposite sides of the food compartment 6.

The manner of using the grilling appliance, including the food holder of FIGS. 4 and 5, will be apparent from the above description. Thus, the movable grill plate 10 is initially in its retracted position, such as shown in FIG. 2, with respect to the food compartment 6. The food article (e.g., a steak or hamburger) to be grilled is placed between the two flexible panels 61, 62 of the food holder 60, and the food holder is than introduced into the food compartment 6. The food article is suspended in the food compartment by the two handles 63, 64 engaging the outer surfaces of the housing top wall 2*f* on opposite sides of the opening 4. The microswitch 53 is actuated by one of the handles to energize the electrical heaters 14 within the grill plates 20,25.

As grill plate 25 presses the food article against grill plate 20, grill plate 20 is permitted to move about all its three orthogonal axes by virtue of its floating mounting (universal joint 40) to the housing; and grill plate 25 is permitted to move about its two orthogonal axes by virtue of its universal joint 45. Grill plates 20 and 25 are thus free to move to conform to the surface of the article being grilled within the food holder 60 as these grill plates apply pressure to the food article.

The firm pressure applied by the grill plates 20 and 25 against the food article being grilled provided good heat transfer from the grill plates to the food article, thereby speeding up the grilling process.

Figure 6:
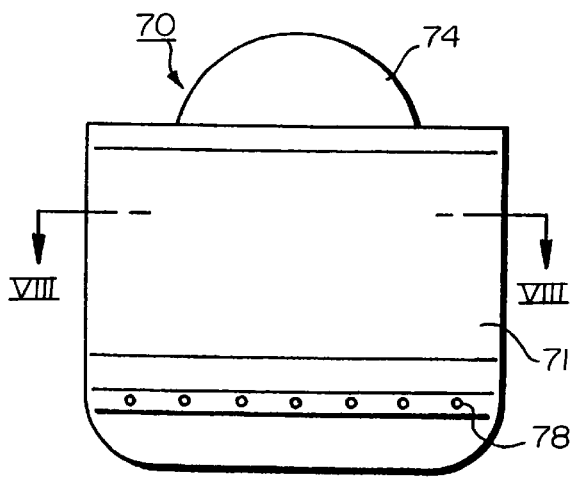
FIGS. 6–8 illustrates another type food holder for use with the grilling appliance, FIG. 7 being a side elevational view of FIG. 6 and FIG. 8 being a sectional view along line VIII—VIII of FIG. 6.
Figure 7:
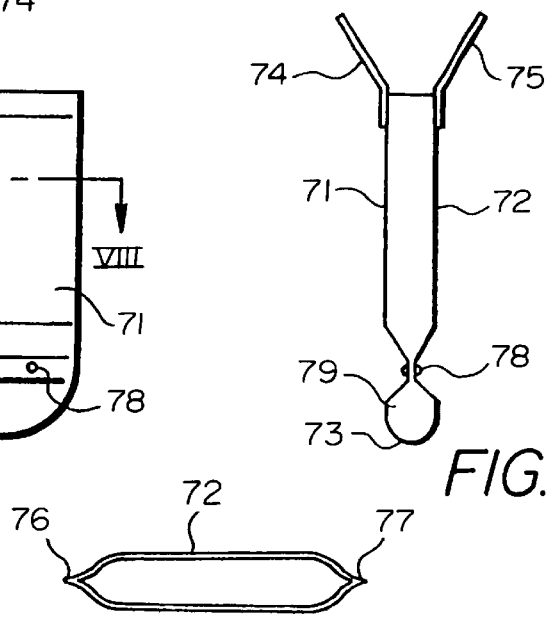
Figure 8:
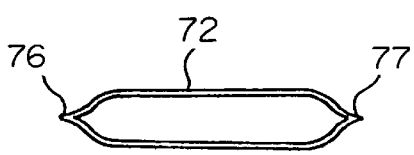

FIGS. 6–8 illustrate a one-time use food holder to be disposed after a single use. In this case, a single sheet is folded at a midportion to define a pair of flexible panels 71, 72 joined at their bottoms 73. The upper ends of the two sheets may be stiffened with cardboard strips to define handles 74, 75 which project outwardly of the appliance housing 2 when the food holder, including the food article held thereby, is inserted through opening 4 into the food compartment 6. In this case, the opposite sides of the flexible panels 71, 72 are joined together, as shown at 76 and 77 in FIG. 8, to produce a pocket for receiving the food article. This pocket is partially closed by a plurality of clips 78 extending through the two panels 71, 72, or by spots of adhesive or spots welds, adjacent the folded bottom 73, to define another compartment 79 for receiving the drippings from the food article.

Figure 9:
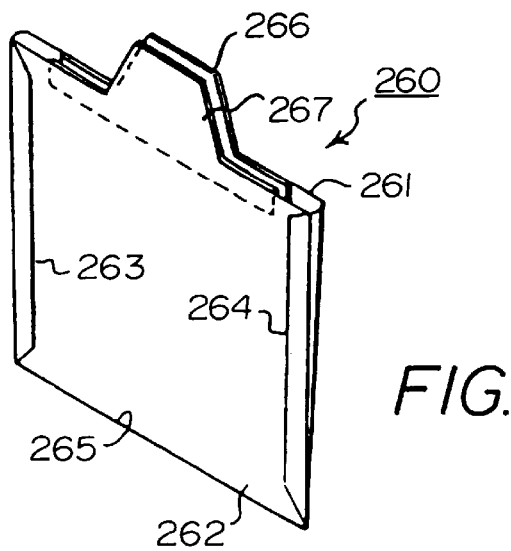
FIG. 9 is a three-dimensional view illustrating another form of food holder that may be used.
Figure 10:
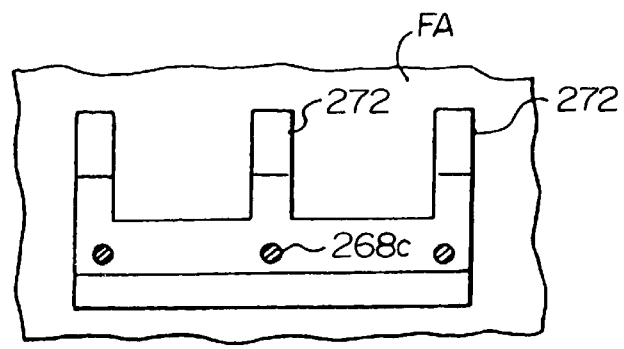
FIG. 10 is a side elevational view of the lower portion of the food holder of FIG. 9.
Figure 11:
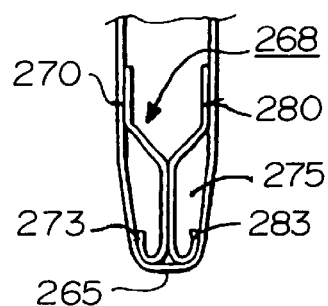
FIG. 11 is an end elevational view of the lower portion of the food holder of FIG. 10.

FIGS. 9–11 illustrate another construction of multiple-use food holder, generally designated 260, including two flexible panels 261, 262, preferably of a heat-resistant, stick-resistant plastic sheet, such as "Teflon". The rear panel 261 may be thicker (e.g., 0.5 mm) than the front panel 262 (e.g., 0.1 mm), and may be bonded to the front panel by ultrasonic welding along its folded-over ends 263, 264, and also along its bottom 265. The two panels 261, 262 are bonded at their upper ends to handless 266, 267 of heat resistant plastic or metal.

The food holder illustrated in FIGS. 9–11 further includes a space member, generally designated 266 for supporting the food article FA (e.g., hamburger, steak, etc) within the food holder but spaced from its bottom 265 to permit the drippings to accumulate in the bottom. Thus, spacer member 268 includes a U-shaped socket at its lower end engageable within, and spacing the food article FA above, the bottom of the food holder.

Space member 268 is preferably made of two stainless strips 270, 280, joined together at a juncture by contact welding points 268c. Each strip is formed with a plurality of upstanding fingers 272 at its upper end which together define the U-shaped socket for receiving the food article. The lower end of each strip is formed with a semi-cylindrical curvature 273, 283 which together define the curved leg engageable with the bottom of the food holder for spacing the food article above the bottom. This space serves as a compartment 275 for receiving drippings from the food article as it is being grilled.

While the invention has been described with respect to several preferred embodiments, it will be appreciated that it is set forth merely for purposes of example, and that many variations may be made. For example, instead of a bellows 100 in the embodiment of FIG. 2, a cylinder coupled to the piston may be employed. Many other variations, modifications and applications of the invention will be apparent.

We claim:

1. A grilling appliance, comprising:
   a housing including a vertical food compartment for receiving a good article in a vertical position;
   a heated first grill plate mounted in a vertical position in one side of the food compartment;
   a heated second grill plate mounted in a vertical position in the opposite side of the food compartment;
   and a manual drive for driving at least one of said grill plates to an extended position towards the other grill plate, and a spring for urging at least one of said first grill plate or second grill plate to a retracted position away from the other grill plate.

2. The appliance according to claim 1, wherein each of said grill plates includes an electrical heater enclosed within the respective grill plate.

3. The appliance according to claim 2, wherein at least one of said first grill plate and said second grill plate is floatingly mounted by a universal joint.

4. The appliance according to claim 3, wherein said first grill plate is floatingly mounted by a universal joint to a wall of the housing.

5. The appliance according to claim 4, wherein said manual drive comprises a pneumatically actuated drive.

6. The appliance according to claim 5, wherein said pneumatically actuated drive comprises:
   (a) a pneumatic linear actuator;
   (b) an pump unit for pumping a fluid into said pneumatic linear actuator;
   (c) a piston coupled at one end to said pneumatic linear actuator;
   (d) a universal joint suspendingly coupling said second grill plate to said piston at the other end thereof; and
   (e) a spring normally urging said second grill plate away from said first grill plate;
   said pneumatic linear actuator operative to extend said second grill plate towards said first grill plate when fluid is forced from said pump unit into said pneumatic linear actuator and move said piston against the force of said spring.

7. The appliance according to claim 6, further including adjustable pressure sensitive valve means for adjusting the pressure applied to said pneumatic linear actuator.

8. The appliance according to claim 7, further including lever means for manually actuating said pump.

9. The appliance according to claim 8, further including a pressure release valve, and timing means for releasing the pressure applied by said pneumatic linear actuator after the desired cooking time has elapsed, permitting the release of fluid from said pneumatic linear actuator through said pressure release valve, thereby allowing said spring to retract said second grill plate away from said first grill plate.

10. The appliance according to claim 9, wherein said pneumatic linear actuator comprises at least one bellows, sand wherein said fluid is air.

11. The appliance according to claim 4, further including
    (a) guide means;
    (b) at least a first plate and second plate slidable within said guide means; and
    (c) a universal joint for suspendedly coupling said second grill plate to said first plate.

12. The appliance according to claim 11, further including
    a rotatable screw passing through a hole in said second plate;
    a lever;
    a gear mechanism engageable by said lever, said gear mechanism containing a gear wheel rotatable when said lever is rotated; and
    an electromagnetic clutch clutching said gear wheel to said rotatable screw, whereby when said lever is rotated, said screw is rotated to cause said first plate to force said second grill plate against a food article located between said first grill plate and said second grill plate.

13. The appliance according to claim 12, further including a first spring located between said second plate and said first plate for normally urging said second grill plate away from said first grill plate, said first spring being compressed to apply pressure on said first plate upon rotation of said lever.

14. The appliance according to claim 13, further including a third plate slidable within said guide means, said screw passing through said third plate, and a second spring located between said second plate and said third plate, said second spring having a higher tension constant than said first spring.

15. The appliance according to claim 14, further including timing means for releasing said electromagnetic clutch, permitting said screw to rotate backwardly by the force of said first spring and said second spring, whereby said first plate and said second plate and said third plate and said second grill plate are pulled away from said first grill plate to release the food located between said first grill plate and said second grill plate.

16. The appliance according to claim 4, wherein said housing includes an opening in a top wall thereof for introducing the food articles into said food compartment, and said appliance further includes a food holder for holding a food article introduceable through said opening into the food compartment.

17. The appliance according to claim 16, wherein said food holder comprises a pair of flexible panels joined at their tops to the pair of handles and joined together at their bottoms for holding the food article between the flexible panels; said pair of handles being engageable with the outer surface of the housing top wall to support the food holder and the food article held thereby in suspension in said food compartment.

18. The appliance according to claim 17, wherein the pair of flexible panels are joined at their bottoms by a clamping member formed with a plurality of drain openings to permit draining of liquid therethrough; said clamping member comprising a pair of openable and closable jaws extending across the pair of flexible panels and joined to their inner faces.

19. The appliance according to claim 17, wherein said pair of flexible panels are constituted of a sheet defining a first pocket for receiving the food article, and a second pocket below the first pocket and communicating therewith via a plurality of openings for collecting drippings from the food article.

20. The appliance according to claim 17, wherein said food holder further includes a spacer member for supporting the food article within the food holder but spaced from the bottom of the food holder, said spacer member including a U-shaped socket at its upper end for receiving the food article, and a curved leg at its lower end engageable with, and spacing the food article above the bottom of the food holder.

* * * * *